United States Patent [19]
Vinchant et al.

[11] Patent Number: 5,461,684
[45] Date of Patent: Oct. 24, 1995

[54] Y-BRANCH DIGITAL OPTICAL SWITCH

[75] Inventors: Jean-Francois Vinchant, Bruyeres le Chatel; Monique Renaud, Saint Cheron, both of France

[73] Assignee: Alcatel N.V., Amsterdam, Netherlands

[21] Appl. No.: 297,029

[22] Filed: Aug. 29, 1994

[30] Foreign Application Priority Data

Aug. 30, 1993 [FR] France ................. 93 10 367

[51] Int. Cl.$^6$ ............................. G02B 6/00; G02B 6/36
[52] U.S. Cl. ................................................. 385/22
[58] Field of Search ............................ 385/20–26

[56] References Cited

U.S. PATENT DOCUMENTS

| | | | |
|---|---|---|---|
| 4,932,736 | 6/1990 | Su ........................................... | 385/22 |
| 5,255,334 | 10/1993 | Mak et al. ............................ | 385/22 X |

FOREIGN PATENT DOCUMENTS

0425991A3  5/1991  European Pat. Off. .

OTHER PUBLICATIONS

J. F. Vinchant et al, "Low Driving Voltage or Current Digital Opitcal Switch on InP for Multiwavelength System Applications", *Electronics Letters*, vol. 28, No. 12, Jun. 1992, pp. 1135–1137.

J. A. Cavailles et al, "First Digital Optical Switch Based on InP/GaInAsP Double Heterostructure Waveguides", *Electronics Letters*, vol. 27, No. 9, Apr. 1991, pp. 699–700.

H. Okayama et al, "Reduction of Voltage–Length Product for Y–Branch Digital Optical Switch", *Journal of Lightwave Technology*, vol. 11, No. 2, Feb. 1993, pp. 379–387.

French Search Report FR 489114.

*Primary Examiner*—Akm E. Ullah
*Attorney, Agent, or Firm*—Sughrue, Mion, Zinn, Macpeak & Seas

[57] ABSTRACT

In a digital optical switch an input waveguide and two divergent output waveguides constitute a guide structure. A median gap between the two output waveguides constitutes a guide gap. Electrodes control the refractive indices of the two output waveguides to couple the input waveguide and one or both output waveguides depending on the value of a control signal. The width of the guide gap is increased in input and output transition areas to render the variation of this width more progressive therein. This is achieved by means of a median aperture at the end of the input waveguide and a progressive variation in the inclination of the facing edges of the output waveguides.

9 Claims, 3 Drawing Sheets

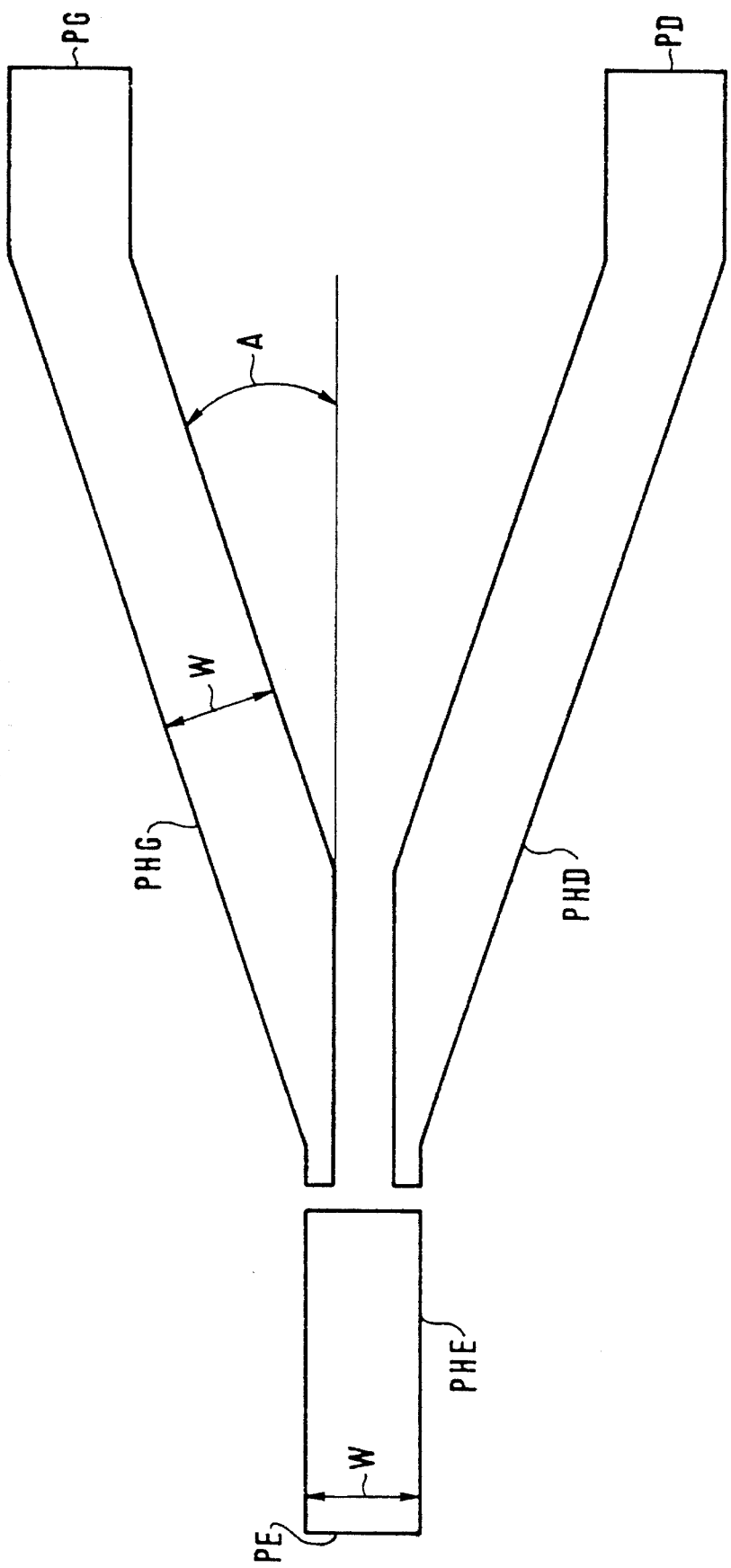

Y-BRANCH DIGITAL OPTICAL SWITCH

BACKGROUND OF THE INVENTION

1. Field of the Invention

The present invention concerns an optical switch of the kind which has an optical input and two optical outputs and receives an electrical control signal. It couples the input to one or other of the outputs, the coupled output being selected by the electrical signal.

2. Description of the Prior Art

Switches of this kind are used, for example, in optical telecommunication networks to constitute switching matrices. It is desirable for these matrices to have high capacities and to be compatible with wavelength division multiplexing. An optical switch for this purpose must have a wide bandwidth, a low sensitivity to polarization, low insertion losses and, most importantly, a high extinction rate. The extinction rate is the ratio of the luminous power at the selected output to that at the other output.

Directional optical couplers are known and have a high extinction rate. They are sensitive to polarization and have a narrow bandwidth, however.

Y-branch digital optical switches (DOS) are also known and have a generic structure described in detail below.

They are insensitive to polarization. Modifications have been made to them to increase their extinction rate. They are described, for example, in an article in Journal of Lightwave Technology, Vol. 11, No. 2, February 1993, pp 379–387, "Reduction of Voltage-length Product for Y-Branch Digital Optical Switch", H. Okayama and M. Kawahara.

The extinction rate of these switches can be increased by increasing the power of the control signal. Any such increase is costly, however, and can cause problems with the removal of heat, especially in the case of a high-capacity switching matrix. This is why the extinction rate of known Y-branch digital optical switches in practise remains too low for the expressed requirements.

One object of the present invention is to increase the extinction rate of a Y-branch digital optical switch in a simple manner and without increasing the power of a control signal. Another object of the present invention is by this means to provide optical switching matrices of increased capacity.

SUMMARY OF THE INVENTION

The present invention consists in a Y-branch digital optical switch in which an input waveguide and two divergent output waveguides constitute a guide structure having a median gap between said two output waveguides constituting a guide gap, electrodes controlling the refractive indices of said two output waveguides to couple said input waveguide to one or both output waveguides according to the value of a control signal, in which switch, in at least one modified transition area, a gap modification renders the variation of the width of said guide gap more progressive.

The gap modifications can comprise a median aperture at the end of the input waveguide and/or a progressive variation in the inclination of two facing edges of the two output waveguides.

How the present invention may be put into effect is described in more detail hereinafter by way of nonlimiting example and with reference to the appended diagrammatic drawings. When the same component is shown in more than one figure it is always identified by the same reference symbol.

BRIEF DESCRIPTION OF THE DRAWINGS

FIG. 3 is a plan view of the guide structure of a prior art Y-branch digital optical switch.

DETAILED DESCRIPTION OF THE PREFERRED EMBODIMENT

Figure 1:
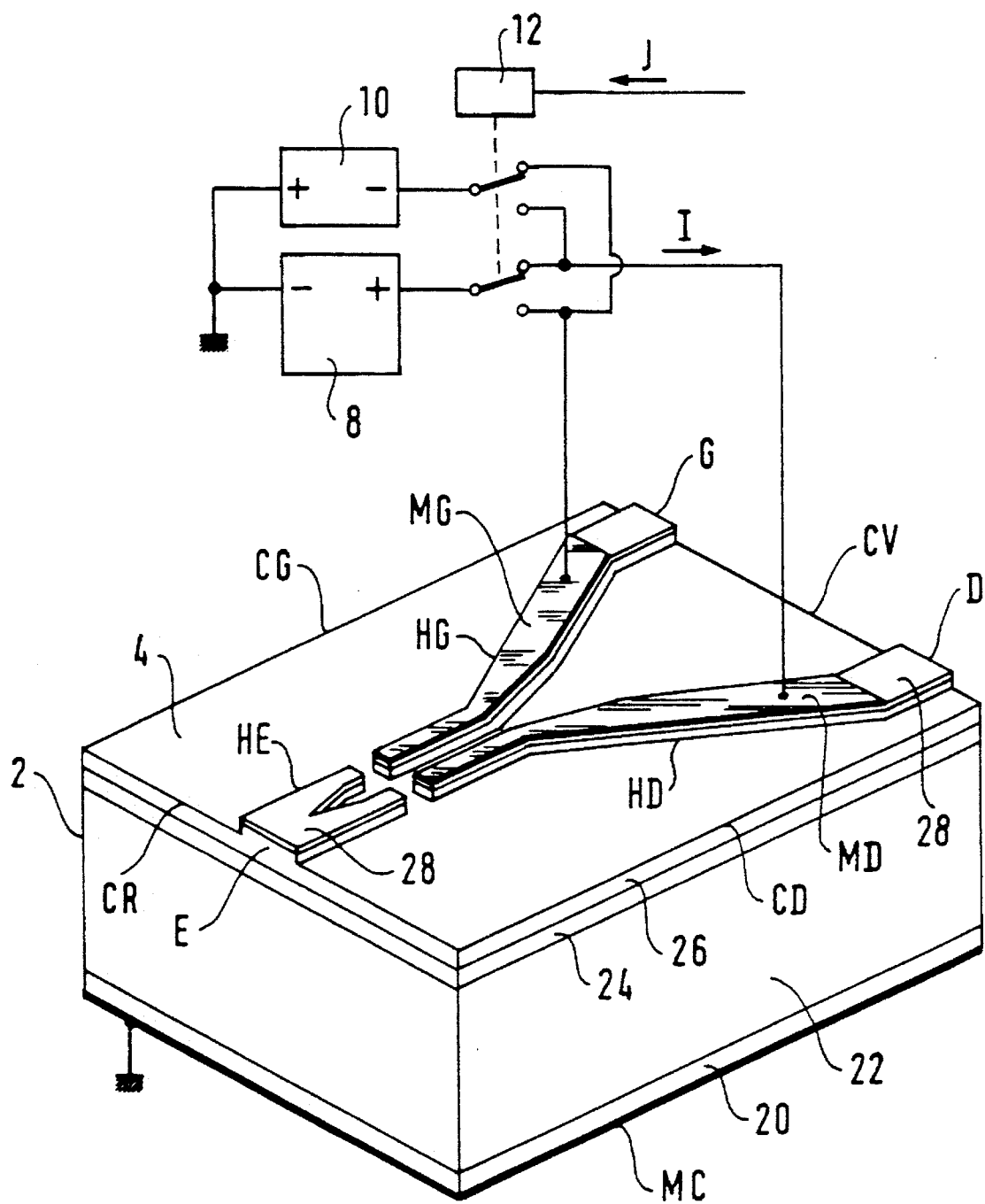
FIG. 1 is a perspective view of a switch in accordance with the present invention.
Figure 2:
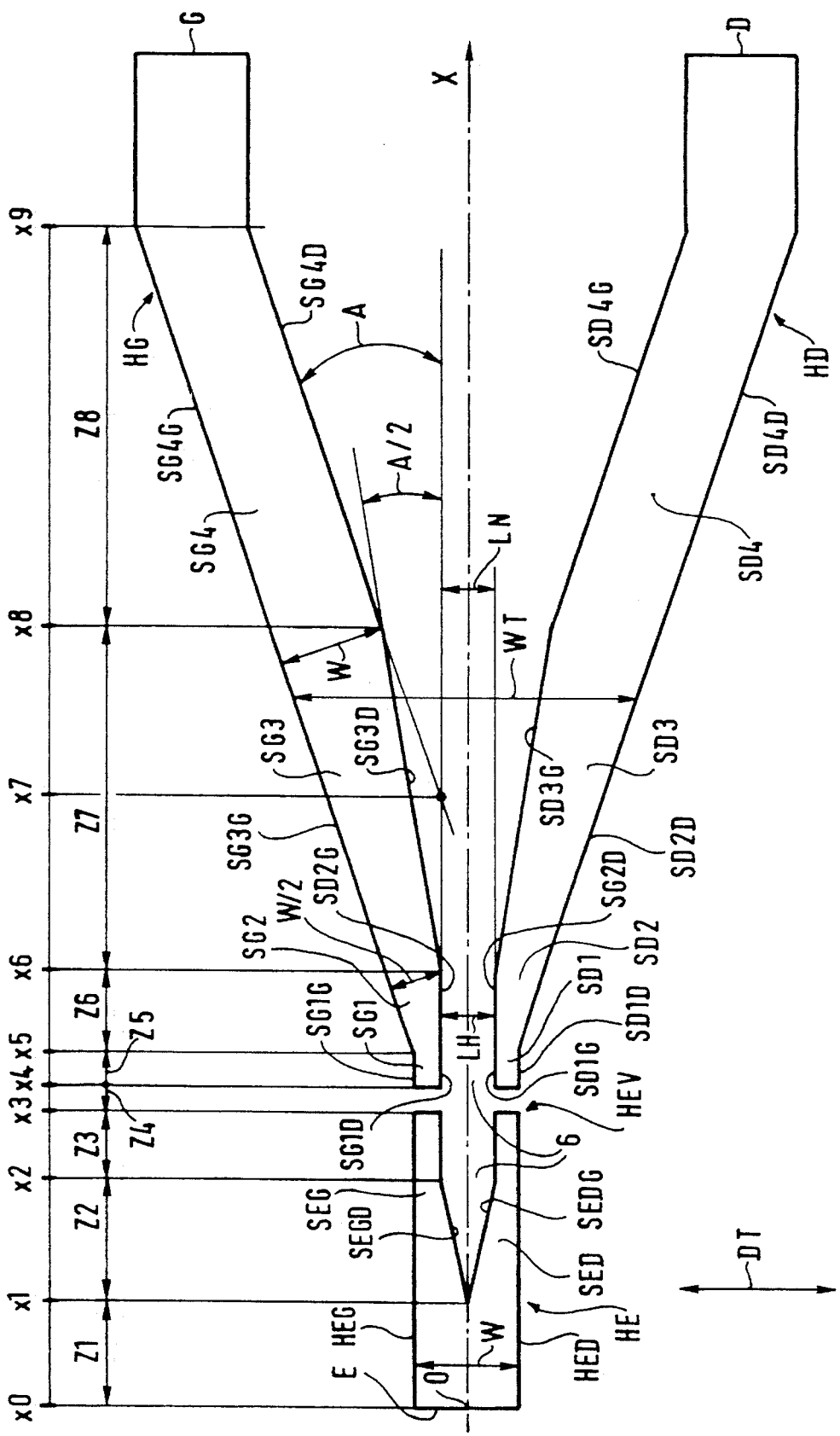
FIG. 2 is a plan view of the guide structure of this switch.

There will first be described, with reference to FIGS. 1 and 2, components of the switch of the invention which have the same function as corresponding components of the prior art switch, these components being referred to hereinafter as "common components". When a common component of the prior art switch is shown in FIG. 3 it is denoted by the letter P followed by the reference symbols which denote the corresponding common component of the switch of the invention.

One such common component of the switch of the present invention is a wafer 2 (see FIG. 1) of a material such as a monocrystalline semiconductor material, for example, which is transparent to a light wave to be processed, for example an infrared light wave. A refractive index of at least one layer of this material is responsive to electrical action, for example to variation of the density of charge carriers injected into this layer by an electric current or removed therefrom by an electric voltage. The wafer lies in a guide plane 4 which is horizontal, for example. It includes a vertical succession of horizontal layers, as follows:

—A heavily doped bottom contact layer 20 of a first conductivity type (for example the n type) in contact with a common electrode MC.

—An n type (for example) substrate 22.

—A guide layer 24 having a refractive index higher than that of the substrate.

—A confinement layer 26 having a refractive index lower than that of the guide layer. The confinement layer has a full thickness in the area of three optical waveguides constituting an input waveguide HE and two output waveguides HD and HG. It thickness is reduced outside this area. Above it is a medium having a refractive index lower than that of this layer, typically the atmosphere, so that said light wave is guided by these waveguides.

—Finally, a heavily doped top contact layer 28 with a second conductivity type opposite the first (i.e. in this example the p type). The top contact layer 28 is present only where the confinement layer 26 has its full thickness. Righthand and lefthand electrodes MD and MG are formed on the top contact layer 28 in the area of the output waveguides HD and HG.

In the guide plane 4 the wafer 2 has:

—a rear edge CR,

—a front edge CV,

—an axis OX (see FIG. 2) with abscissae x1, . . . , x9 increasing from the rear edge to the front edge in a longitudinal direction defined by this axis, —a righthand side CD, —a lefthand side CG, and —a transverse direction DT joining the righthand side and the lefthand side.

Areas Z1, ..., Z8 are each defined by one of said abscissae or between two of said abscissae.

The switch includes:

—an input E on said rear edge to receive said light wave,

—two outputs D, G on said front edge to output said light wave, these two outputs constituting a righthand output D on the righthand side of said axis and a lefthand output G on the lefthand side of said axis, and —a combination of said waveguides HE, HD, HG. The latter are formed in the guide plane 4 to guide the wave on command monomodally between this input and one or both of the two outputs.

Each of these waveguides is in the form of a linear strip. It has a width at all points. It also has righthand and lefthand edges in the guide plane. Its width constitutes a nominal waveguide width W when it is only slightly less than (for example between 50% of and 100% of) a multimode guide width beyond which the guide could guide said light wave multimodally. Each edge has in each area the general shape of a straight line segment associated with that edge. Some of these edges are parallel to the longitudinal direction of the switch. Others of these edges are inclined relative to this direction.

The set of guides includes:

—an input guide HE extending along the axis OX with a nominal waveguide width between a rear end constituting said input E and a front end HEV of the guide, this front end having an abscissa x3, the input waveguide having righthand and lefthand edges HED, HEG, and —a righthand output waveguide HD and a lefthand output waveguide HG extending in optical continuity with the input waveguide to the righthand side and to the lefthand side of the axis OX from an output waveguide starting abscissa x4 at least equal to the abscissa x3 at the front end of the input waveguide as far as the righthand and lefthand outputs D and G, respectively.

Each righthand (or lefthand) output waveguide includes segments in sequence from the rear towards the front:

—A righthand receiver segment SD1 (or lefthand receiver segment SG1) corresponding to this output waveguide and extending in said longitudinal direction. Each of these receiver segments occupies a controlled reception area Z5 extending from said output waveguide start abscissa x4 to a divergence abscissa x5. Its width is less than 50% of said nominal waveguide width W. It also has a righthand outside edge SD1D (or lefthand outside edge SG1G) associated with the same straight line as the righthand edge HED (or the lefthand edge HEG) of the input waveguide HE. Finally, it has a lefthand inside edge SD1G (or righthand inside edge SG1D) facing the inside edge of the receiver segment of the other output waveguide, i.e. the lefthand (or righthand) output waveguide. A gap 6 is left between the inside edges of the two receiver segments. This gap has a constant width constituting a nominal gap width LN.

—Finally, righthand divergence segments SD2, ..., SD4 or lefthand divergence segments SG2, ..., SG4 correspond to said output waveguides and righthand or lefthand receiver segment. They extend in sequence towards the front and towards the righthand (or lefthand) side from said divergence abscissa. Each righthand (or lefthand SG4) divergence segment has a righthand (or lefthand SG4G) outside edge and a lefthand (or righthand SG4D) inside edge. The successive divergent segments of each righthand (or lefthand) output waveguide constitute a righthand SD4 (or lefthand SG4) output segment in an output area Z8 situated at abscissae x8, x9 substantially greater than the divergence abscissa x5. The straight lines associated with the outside and inside edges SD4D, SD4G, SG4D, SG4G of each output segment have the same inclination constituting a nominal inclination A of the output segment. They intersect the straight lines associated with the outside and inside edges of the corresponding receiver segment at respective outside and inside intersection abscissae x5, x7. In this example the outside intersection abscissa is the divergence abscissa x5. The width of these output segments is the nominal width W.

For the light wave to be treated the set of input and output waveguides constitutes a guide structure extending from the rear edge CR to the front edge CV and having a total width WT in the transverse direction DT. This total width constitutes firstly the nominal waveguide width W in the areas Z1, ..., Z5 occupied by the input waveguide HE and said receiver segments SD1 and SG1 of the output waveguides. It then increases progressively towards the front from the divergence abscissa x5.

The guide structure for guiding said light wave has a guide gap 6 extending along the axis OX and having a width in the transverse direction DT. The guide gap 6 is present at the abscissae x2, ..., x9 which are greater than a gap start abscissa x2 which is not greater than said output waveguide start abscissa x4. The gap is absent at abscissae x0 less than the gap start abscissa. A gap width LH is defined at each abscissa. It is equal to the width of the guide gap or has a null value according to whether the guide gap is present or absent at the abscissa concerned. The gap width is therefore a null width in an input area Z1 occupied by the input waveguide HE prior to the gap start abscissa x2. It is then equal to the nominal gap width LN in the controlled reception area Z5. Finally, it increases in the output area Z8 to procure progressive decoupling of two modes of said light wave which can be guided by respective output waveguides so that beyond a front end of this output area the two output waveguides cease to cooperate to constitute a guide structure.

A gap widening rate can be defined at each abscissa as a rate of increase of the gap width as a function of the abscissa. This rate therefore has a null value if the gap width remains at a null value or remains equal to the nominal gap width. In the output area Z8 this rate is defined by the nominal inclinations and then constitutes a nominal gap widening rate. Specifically, the inclinations of the two output waveguides are the same, the two output waveguides being symmetrical to the OX axis and therefore at the same angle A to that axis. The nominal gap widening rate therefore has the value tan2A.

The arrangements as described above define two transition areas, one at the input and the other at the output, in which the gap widening rate as defined above is subject to variation:

The input transition area Z2, Z3, Z4 includes gap start and output waveguide start abscissae x2, x4. In this area increasing and decreasing variations in the gap widening rate cause the gap width to change from a value initially remaining at a null value in the input area Z1 to a value then remaining equal to the nominal gap width LN in the controlled reception area Z5.

The output transition area Z7 includes the inside intersection abscissa x7. It causes the gap widening rate to change from a value which is initially a null value in the vicinity of the controlled reception area Z5 to a final value equal to the nominal gap widening rate in the output area Z8.

The righthand electrode MD and the lefthand electrode

MG are respectively formed on the righthand output waveguide HD and the lefthand output waveguide HG, starting from their receiver segments SD1 and SG1. They continue at least as far as a rear end of the output area Z8 and preferably (as shown) as far as a front end x9 of the these areas. They enable selective application to these waveguides of the electrical action required to cause the required local modifications of their refractive indices.

The switch finally includes an electrical supply 8, 10, 12 receiving a control signal J and responding thereto by applying to the electrodes an electrical signal I so that said local modifications of the refractive indices optically couple the input waveguide HE to said righthand output waveguide HD and/or to the lefthand output waveguide HG, depending on the value of the control signal.

Specifically, in this example, the control signal J controls an electric switch 12. The latter activates one of the righthand and lefthand electrodes. It connects the latter to a source 8 of a positive potential relative to the ground connection constituted by common electrode MC. A current then flows across the wafer 2 from the activated electrode and injects charge carriers into the guide layer 24.

The electrode which is not activated is connected to a negative potential source 10 to cause depletion of carriers under this electrode. This reduces the refractive index under the activated electrode and the light wave to be treated received in the waveguide HE passes into the output waveguide with the higher index.

The nominal gap width LN previously referred to is chosen to ensure mutual electrical isolation of the righthand and lefthand electrodes MD, MG in the controlled reception area Z5.

In the prior art switch the input waveguide PHE and the output waveguides PHD and PHG have the shapes shown in FIG. 3.

In accordance with the present invention at least one of said two transition areas is subject to a modification whereby the guide gap width is locally modified, as compared with what has previously been described, to limit the maximal value of the gap widening rate in this area. Such modification can advantageously take either or preferably both of two forms, depending on whether one or both transition areas are modified. These two forms are shown in FIGS. 1 and 2.

In a first form of modification the gap start abscissa x1 is substantially less than the abscissa at the end of the input waveguide x3. The input transition area Z2, Z3, Z4 then extends from this gap start abscissa x1, including this input waveguide end abscissa x3 and constituting a modified transition area. The input waveguide occupies all of its nominal width W in the input area Z1. The input transition area includes a gap formation area Z2 extending from said gap start abscissa x1. In this gap formation area the input waveguide HE divides into righthand and lefthand partial waveguides SED and SEG separated by a median aperture constituting a first segment of the guide gap 6. The width of this opening increases progressively from a null width at the gap start abscissa x1 to the nominal gap width LN at a gap stabilization abscissa x2.

Each of the righthand SED and lefthand SEG partial waveguides then has a respective lefthand edge SEDG or righthand edge SEGD constituting an inside edge of this partial waveguide. Specifically, this inside edge is rectilinear and has an inclination which is less than said nominal inclination A of the output segments SD4 and SG4. This inclination is typically between one milliradian and ten milliradians.

The input transition area Z2, Z3, Z4 preferably further includes a gap maintenance area Z3 extending from the gap stabilization abscissa x2 to the abscissa at the front end of the input waveguide x3. In this gap maintenance area the aperture between the righthand and lefthand partial waveguides SED, SEG has said nominal gap width LN at all points.

Specifically, the gap maintenance area Z3 has a length between 10% and 150% of the length of the gap formation area Z2.

This first form of modification reduces optical losses when light passes from the input waveguide to whichever of the output waveguides is to receive the light wave to be treated. This reduction results from the fact that the optical mode guided by the end of the input waveguide is better suited to the shape of the mode that will be guided by one of the output waveguides.

In a second form of modification the output transition area Z7 extends from an output transition start abscissa x6 to an output transition end abscissa x8 to constitute a modified transition area. In this area a divergent segment of each righthand or lefthand output waveguide is constituted by a righthand SD3 (or lefthand SG3) output transition segment having a lefthand SD3G (or lefthand SG3D) inside edge facing a righthand (or lefthand) inside edge of the other output transition segment (i.e. the lefthand (or righthand) segment), and these inside edges of the output transition segments have intermediate inclinations which are a fraction of the nominal inclination A, for example A/2. The output transition start abscissa x6 is preferably greater than the divergence abscissa x5.

Specifically, the inside edge SG3D of each output transition segment SG3 is rectilinear and has an inclination between 25% and 75% and preferably equal to around 50% of the nominal inclination A. This righthand SD3 or lefthand SG3 output transition segment has a righthand SD3D (or lefthand SG3G) outside edge. This outside edge is rectilinear and aligned with the outside edge SD4D, SG4G of the righthand SD4 (or lefthand SG4) output segment. The righthand HD (or lefthand HG) output waveguide preferably further includes a righthand SD2 (or lefthand SG2) outside divergence segment in an outside divergence area Z6 extending from the divergence abscissa x5 to the output transition start abscissa x6. This outside divergence segment has a lefthand SD2G (or righthand SG2D) rectilinear inside edge aligned with the inside edge SD1G, SD1D of the righthand SD1 (or lefthand SG1) receiver segment and a righthand SD2D (or lefthand SG2G) rectilinear outside edge aligned with the outside edge SD4D, SG4G, SD3D, SG3G of the righthand SD4 (or lefthand SG4) output segment and the righthand SD3 (or lefthand SG3) output transition segment. The output transition start abscissa x6 is preferably such that the width of each output waveguide at this abscissa is between 30% and 70% and preferably equal to around 50% of the nominal width W of the output segment.

This second form of modification further reduces optical losses of the switch, in particular in the fully switched state, i.e. when all the light from the light wave to be treated is output from a single one of two outputs.

In a manner that is known in itself, the input transition area Z2, Z3, Z4 preferably further includes a contact layer interruption area Z4 extending between the input waveguide front end abscissa x3 and the output waveguide start abscissa x4. Interrupting the top contact layer 28 prevents unwanted electrical contact between the righthand and lefthand electrodes MD, MG through this layer.

A method that is known in itself to facilitate fabrication of the switch using auto-alignment methods reduces the thickness of the confinement layer 26 in the contact layer interruption area. This constitutes a spurious interruption of the optical waveguide structure. However, the length of the interruption is sufficiently small for optical functioning of the switch not be significantly affected.

The switch of the invention described by way of example is symmetrical about its axis OX. An asymmetric switch can have one output waveguide wider than the other, especially if the switch is dedicated to fail-safe applications requiring no electrical consumption in the passive state, i.e. in the absence of any control signal, with all of the light directed to a single output. It is to be understood that the invention is equally advantageous when applied to any such asymmetric switch.

There is claimed:

1. Y-branch digital optical switch including a wafer at least in part made from a transparent material having a refractive index sensitive to electrical action, said wafer having:

—a guide plane and, in said plane:

—a rear edge,

—a front edge,

—an axis with abscissae increasing from said rear edge to said front edge in a longitudinal direction defined by said axis, areas being each defined by one said abscissa or between two said abscissae, —a righthand side, —a lefthhand side, and —a transverse direction joining said righthand and lefthand sides, said switch including:

—an input situated on said rear edge to receive a light wave,

—two outputs situated on said front edge to output said light wave, said two outputs constituting a righthand output on the righthand side of said axis and a lefthand output on the lefthand side of said axis, and —a set of waveguides formed in said guide plane to guide said light wave monomodally on command between said input and one or both of said two outputs, each of said waveguides extending in linear strip form and having a width at each point and righthand and lefthand edges in said guide plane, said width constituting a nominal waveguide width when it is only slightly less than a multimode waveguide width beyond which said waveguide could guide said light wave multimodally, each said edge having in each said area the general shape of a segment of a straight line associated with said edge, some of said edges being parallel to said longitudinal direction of the switch and others of said edges being inclined relative to said longitudinal direction, said set of waveguides including:

—an input waveguide extending along said axis with a nominal waveguide width between a rear end constituting said input and a front end of said waveguide, said front end having an abscissa, said input waveguide having righthand and lefthand edges, and —righthand and lefthand output waveguides in optical continuity with said input waveguides on the righthand side and on the lefthand side of said axis starting from an output waveguide start abscissa at least equal to said input waveguide front end abscissa and extending as far as righthand and lefthand outputs, respectively, each of said righthand and lefthand output waveguides including in succession from the rear towards the front:

—a righthand or lefthand receiver segment corresponding to said output waveguide, extending in said longitudinal direction and occupying a controlled reception area extending from said output waveguide start abscissa to a divergence abscissa, said receiver segment having a width equal to a fraction less than 50% of said nominal waveguide width, said segment also having a righthand or lefthand outside edge associated with the same straight line as said righthand or lefthand edge of the input waveguide, said segment further having a lefthand or righthand inside edge facing the inside edge of the receiver segment of the other (i.e. lefthand or righthand) output waveguide, a gap being left between the inside edges of said two receiver segments, said gap having a width constituting a nominal gap width, and —successive righthand and lefthand divergent segments corresponding to said righthand or lefthand output waveguide and receiver segment and extending in succession towards the front and towards the righthand or lefthand side, respectively, from said divergence abscissa, each of said righthand or lefthand divergent segments having a righthand or lefthand outside edge and a lefthand or righthand inside edge, respectively, said successive divergent segments of each righthand or lefthand output waveguide respectively constituting a righthand or lefthand output segment in an output area situated at abscissae substantially greater than said divergence abscissa, the straight lines associated with outside and inside edges of each output segment having the same inclination constituting a nominal inclination of said output segment, said straight lines intersecting the straight lines associated with the outside and inside edges of the corresponding receiver segment at outside and inside intersection abscissae, respectively, the width of said output segments being a nominal width, —the set of said input and output waveguides constituting for said light wave a guide structure extending from said rear edge of said front edge and having a total width in said transverse direction, said total width constituting firstly said nominal waveguide width in the areas occupied by said input waveguide and by said output waveguide receiver segments, and then increasing progressively towards the front from said divergence abscissa, —said guide structure having for guiding said light wave a guide gap extending along said axis and having a width in said transverse direction, said guide gap being present at those of said abscissae which are greater than a gap start abscissa not greater than said output waveguide start abscissa and being absent at those of said abscissae which are less than said gap start abscissa, a gap width being defined at each abscissa and being equal to the width of the guide gap or having a null width depending on whether said guide gap is present or absent at the abscissa concerned, so that said gap width is a null width in said input area occupied by said input guide prior to said gap start abscissa, said gap width being then equal to said nominal gap width in said controlled reception area, said gap width finally increasing in said output area to procure progressive decoupling of two modes of said light wave adapted to be respectively guided by said output waveguides so that beyond a front end of said output area said two output waveguides cease to constitute said guide structure, —a gap widening rate being defined for each abscissa as the rate of increase in said gap width as a function of said abscissa so that said rate is a null rate when said gap width remains at a null value or remains equal to said nominal gap width and so that said rate is defined by said nominal inclinations in said output area, the rate defined by said inclinations constituting a nominal gap widening rate, —two transition areas being thus constituted wherein said gap widening rate is subject to variation, an input transition area including said gap start abscissa and said output waveguide start abscissa and subject to increasing and decreasing variations in said gap widening rate to change said gap width from a value at first remaining at a null value in said input area to a value remaining equal to said nominal gap width in said controlled reception area, an output transition area including said inside intersection abscissa and changing said gap widening rate from a value which is initially a null value in said controlled reception area to a value equal to said nominal gap widening rate in said output area, —said switch further including:

—a set of electrodes including a righthand electrode and a lefthand electrode respectively formed on said righthand output waveguide and said lefthand output waveguide from their said receiver segments and at least as far as a rear end of said output area to enable selective application to said waveguides of electrical action causing local modification of the refractive indices of said waveguides, —said electrodes being responsive to an electrical signal whereby said local modifications of refractive index optically couple said input waveguide to said righthand and/or said lefthand output waveguide, according to the value of said control signal, —said nominal gap width being chosen to procure mutual electrical isolation of said righthand and lefthand electrodes in said controlled reception area, —in which switch at least one of said two transition areas constitutes a modified transition area in which said guide gap modification increases the width of said guide gap, this increase being localized so as to limit the maximal value of said gap widening rate in said area.

2. Switch according to claim 1 wherein said gap start abscissa is substantially less than said input waveguide end abscissa, said input transition area extending from said gap start abscissa, including said input waveguide end abscissa and constituting one said modified transition area, —said input guide occupying completely said nominal waveguide width in said area, —said input transition area including a gap formation area extending from said gap start abscissa, said input waveguide dividing in said gap formation area into righthand and lefthand partial waveguides separated by a median aperture constituting a first segment of said guide gap and having a width increasing progressively from zero at said gap start abscissa to said nominal gap width at a gap stabilization abscissa.

3. Switch according to claim 2 wherein each of said righthand and lefthand partial waveguides has a respective lefthand or righthand edge constituting an inside edge of said partial waveguide, said inside edge being rectilinear and having an inclination between 1 mrd and 10 mrd.

4. Switch according to claim 2 wherein said input transition area further includes a gap maintenance area extending from said gap stabilization abscissa to said abscissa at the front end of the input waveguide and in which said waveguide gap separating said righthand and lefthand partial waveguides has said nominal gap width at all points.

5. Switch according to claim 4 wherein said gap maintenance area has a length between 10% and 150% of the length of said gap formation area.

6. Switch according to claim 1 wherein said output transition area extends from an output transition start abscissa to an output transition end abscissa to constitute one said modified transition area, one said divergent segment of each of said righthand and lefthand output waveguides being constituted in this area by a righthand or lefthand output transition segment having a lefthand or righthand inside edge facing a righthand or lefthand inside edge of the other (lefthand or righthand, respectively) of said output transition segments, said inside edges of said output transition segments having intermediate inclinations which are fractions of said nominal inclination.

7. Switch according to claim 6 wherein said output transition start abscissa is greater than said divergence abscissa.

8. Switch according to claim 6 wherein said inside edge of each of said output transition segments is rectilinear and has an inclination between 25% and 65% of said nominal inclination, said righthand or lefthand output transition segment having a righthand or lefthand outside edge, respectively, said outside edge being rectilinear and aligned with said outside edge of the righthand or lefthand output segment, respectively, said righthand or lefthand output waveguide further including a righthand or lefthand outside divergence segment extending in an outside divergence area from said divergence abscissa to said output transition start abscissa with a lefthand or righthand rectilinear inside edge aligned with said inside edge of the righthand or lefthand receiver segment, respectively, and a righthand or lefthand rectilinear outside edge aligned with said outside edge of the righthand or lefthand output segment and the righthand or lefthand output transition segment, respectively, said output transition start abscissa being such that the width of each output waveguide at said abscissa is between 30% and 60% of said nominal width of said output segment.

9. Switch according to claim 1, said wafer comprising a monocrystalline semiconductor material in which layers are stacked in a direction perpendicular to said guide plane, said layers constituting in succession:

—a highly doped bottom contact layer with a first type of conductivity in contact with a common electrode, —a substrate, —a guide layer having a refractive index higher than said substrate, —a confinement layer having a refractive index lower than said guide layer, said confinement layer having its full thickness in the area of said waveguides, said layer having a reduced thickness outside this area and having on top of it a medium having a refractive index lower than said layer so that said light wave is guided by said waveguide, and —a highly doped top contact layer with a second type of conductivity opposite to said first type, said top contact layer being present only where said confinement layer has said full thickness, —said righthand and lefthand electrodes being present on said top contact layer in part of the area of said output waveguides, —said input transition area further including a contact layer interruption area extending between said input waveguide front end and output waveguide start abscissae so that absence of said top contact layer in said contact layer interruption area prevents unwanted electrical contact between said righthand and lefthand electrodes through said top contact layer.

* * * * *